Patented May 18, 1943

2,319,359

UNITED STATES PATENT OFFICE 2,319,359

MANUFACTURE OF CATION-EXCHANGING ARTIFICIAL RESINS

Hans Wassenegger, Dessau in Anhalt, Germany; vested in the Alien Property Custodian No Drawing. Application November 18, 1938, Serial No. 241,187. In Germany December 11, 1937

6 Claims. (Cl. 260—54)

The present invention relates to the manufacture of artificial resins, especially cation-exchanging resins; specific details are following hereafter.

It is known that the acid character of cation-exchanging artificial resins which have been prepared on the basis of, for instance, phenols may be enhanced by introducing before, during or after the condensation with formaldehyde or the like, sulphonic acid groups into the cyclic basic bodies. By the treatment with sulphonating agents before or during the condensation the capacity for condensation of the phenols is, however, affected materially since the number of places suitable for the reaction with aldehydes is diminished. By the subsequent sulphonation either the surface only is attacked or the resin molecules are easily split up. Therefore, only a limited number of resins which are sufficiently stable and have an enhanced capacity can be obtained.

According to this invention so-called "solid" acids having especially good cation-exchanging properties may be made by using for the condensation with the mono and/or polyhydric phenols besides formaldehyde or equivalents thereof aldehydes of aromatic or aliphatic nature which contain sulphonic acid or carboxylic acid groups, for instance, benzaldehyde sulphonic acids, benzaldehyde carboxylic acids, acetaldehyde sulphonic acid, glyoxylic acid or the like. There may also be used as parent material mono and/or polyhydric phenols containing sulphonic acid or carboxylic acid groups in the nucleus or in the side chains. By a suitable selection of the components it is possible to prepare a series of so-called "solid" acids with graded properties in order to perform, if desired, a selective separation of different metal ions or to adapt the resins to the special nature of liquids to be treated.

The following examples illustrate the invention; the parts are by weight unless otherwise stated:

Example 1.—550 parts of resorcinol, 480 parts of sodium benzaldehyde-2,4-disulphonate and 10 parts of caustic soda are dissolved in 700 parts of water and the whole is boiled for 30 minutes. The solution is then cooled to 25° C. and 800 parts of formaline (30% strength) are added. The mixture slowly becomes warm and solidifies at about 60° C. to a gelatinous mass. This jelly is dried at 80° C. and then introduced into water whereby the gel breaks to pieces. The parts which are smaller than 0.5 mm. and larger than 1.5 mm. are removed by sieving. By adjusting the material to an exchange of hydrogen ions and passing thereover, by means of a filter, well water of 25° of German hardness until traces of calcium pass through the filter, 1 liter of the material is charged with 22 grams of CaO. A known resin of para-phenolsulphonic acid and formaldehyde, however, absorbs only about 7 grams of CaO.

Example 2.—440 parts of resorcinol, 710 parts of sodium benzaldehyde-2-sulphonate and 10 parts of caustic soda are dissolved in 800 parts of water, the whole is warmed for 2 hours on the steam bath and then heated with 720 parts of formaline (30% strength). After about 20 minutes the mixture solidifies to a solid jelly which is dried at 80° C. By introducing the dry resin into water it bursts to small pieces which, after suitable sieving or comminution and treatment with an acid yields a mass which is very well adapted for exchanging hydrogen ions. 1 liter of the material, treated as in Example 1, absorbs 14 grams of CaO.

Example 3.—A solution of 220 parts of resorcinol, 252 parts of sodium sulphite and 220 parts of formaline (30% strength) in 1200 cc. of water is heated for 5 hours at 100° C., the corresponding ω-sulphonic acid being formed. A solution is added which has been obtained by boiling for 2 hours a mixture of 1100 parts of resorcinol, 530 parts of sodium benzaldehyde-2,4-disulphonate and 100 parts by volume of caustic soda solution of 50% strength dissolved in 1100 parts of water. At 25° C. 2000 parts of formaline (30% strength) are then introduced into this mixture whereupon the solution solidifies to a clear jelly, its temperature rising to about 90° C. The jelly is dried at 80° C. and comminuted as described in Example 1. The material is a very good exchanger for cations.

Example 4.—110 parts of resorcinol, 200 parts of sodium benzaldehyde-3-sulphonate and 10 parts of caustic soda are dissolved in 250 parts of water and the whole is heated for 2 hours on the steam bath. 150 parts of formaline (30% strength) are then added whereupon the mass gradually solidifies to a glass-like jelly which is worked up as indicated in Example 1. 1 liter of the exchanging material, when treated as described in Example 1, absorbs 12 grams of CaO.

Example 5.—110 parts of resorcinol, 150 parts of benzaldehyde-2-carboxylic acid and 50 parts by volume of concentrated caustic soda solution, dissolved in 180 parts of water, are boiled for 2 hours under reflux. At 45° C. 180 parts of formaline (30% strength) are added to the reaction mass and the whole is heated on the steam bath. After some time the solution solidifies to a jelly which is dried and introduced into water. After suitable sieving the material is a very good neutral exchanger.

*Example 6.*—940 parts of phenol and 800 parts of sodium benzaldehyde-2,4-disulphonate are dissolved in 1000 parts of 2 N-caustic soda solution and the whole is boiled for ½ hour under reflux. 2500 parts of formaline (30% strength) are added to this solution whereupon the whole is heated to 100° C. until it gelatinises. After drying and comminution the resin obtained is a very good cation-exchanging substance.

*Example 7.*—550 parts of resorcinol, 320 parts of sodium benzaldehyde-2,4-disulphonate and 20 parts of caustic soda are dissolved in 700 parts of water and the whole is boiled for 2 hours under reflux. At 20° C. 800 parts of formaline (30% strength) are added whereupon the solution solidifies with spontaneous heating to about 65° C. The jelly obtained is worked up as described in Example 1.

Instead of the sodium benzaldehyde-2,4-disulphonate mentioned in Examples 6 and 7 the sodium benzaldehyde-3,5-disulphonate may also be used.

*Example 8.*—215 parts of acetaldehyde disulphonic acid and 160 parts of sulphuric acid of 50% strength are introduced into a solution of 440 parts of resorcinol in 600 parts of water. During the reaction which takes place the temperature is kept at 60–70° C. and the whole is subsequently boiled for 1 hour. To the solution cooled to 10° C. 650 parts of formaline of 30% strength are added while quickly stirring, whereupon the mass solidifies to a homogeneous resin which is dried at 80° C. and comminuted. When treated as described in Example 1 one liter of the material absorbs 23 grams of CaO.

*Example 9.*—440 parts of resorcinol, 140 parts of glyoxylic acid and 10 parts of concentrated sulphuric acid are dissolved one after the other in 850 parts of water. The mixture is heated to the boiling point for 1½ hours and after cooling to 25° C. and alkalization 650 parts of formaline of 30% strength are added. While the temperature is rising slowly to about 90° C. the solution solidifies to a clear jelly which is dried and comminuted according to Example 1. The resin obtained is a very good cation-exchanging material.

*Example 10.*—1000 parts of an aqueous solution of para-phenol sulphonic acid (50%) are heated for one hour to the boiling point with 140 parts of benzaldehyde-2,4-disulphonic acid, 550 parts of formaline (30% strength) are slowly added and the temperature is maintained at 80 to 100° C. for 12 hours. After the first hour the solution begins to solidify and remains finally as a solid jelly, which is dried and comminuted according to Example 1. The resin obtained has excellent cation-exchanging properties.

*Example 11.*—154 parts of 1,3,5-dihydroxybenzene-carboxylic acid, 60 parts of benzaldehyde disulphonic acid and 40 parts of caustic soda are dissolved in 400 parts of water and boiled for 2 hours under reflux. After cooling 140 parts of formaline of 30% strength are added at 20° C. After 10 minutes the solution solidifies at 80° C. to a jelly, which is kept for further 10 hours at the same temperature. After drying and comminution according to Example 1 a resin with excellent cation-exchanging properties is obtained.

The invention is of course not limited to the specific details described, for obvious modifications may occur to a person skilled in the art.

What I claim is:

1. A process for preparing water-insoluble resins which comprises condensing a phenol with an aldehyde containing an acid radical selected from the class consisting of carboxylic and sulfonic acid radicals and formaldehyde.

2. A process for preparing water-insoluble resins which comprises condensing a phenol with an aldehyde containing a sulphonic acid group and formaldehyde.

3. A process for preparing water-insoluble resins which comprises condensing resorcinol with acetaldehyde disulphonic acid and formaldehyde.

4. A process for preparing water-insoluble resins which comprises condensing phenol with benzaldehyde disulphonic acid and formaldehyde.

5. A process for preparing water-insoluble resins which comprises condensing resorcinol with benzaldehyde disulphonic acid and formaldehyde.

6. Water-insoluble cation exchanging resins substantially identical with those obtained by condensing a phenol with an aldehyde containing an acid radical selected from the class consisting of carboxylic and sulphonic acid radicals and formaldehyde.

HANS WASSENEGGER.